US010751974B2

(12) United States Patent
Yun et al.

(10) Patent No.: US 10,751,974 B2
(45) Date of Patent: Aug. 25, 2020

(54) MULTILAYER STRUCTURE, A LAMINATE COMPRISING THE SAME AND ARTICLES COMPRISING THE LAMINATE

(71) Applicant: Dow Global Technologies LLC, Midland, MI (US)

(72) Inventors: Xiao Bing Yun, Beijing (CN); Jianping Pan, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 61 days.

(21) Appl. No.: 15/531,768

(22) PCT Filed: Dec. 12, 2014

(86) PCT No.: PCT/CN2014/093708
§ 371 (c)(1),
(2) Date: May 31, 2017

(87) PCT Pub. No.: WO2016/090633
PCT Pub. Date: Jun. 16, 2016

(65) Prior Publication Data
US 2017/0259526 A1    Sep. 14, 2017

(51) Int. Cl.
| | |
|---|---|
| B32B 7/02 | (2019.01) |
| B32B 27/32 | (2006.01) |
| B32B 7/12 | (2006.01) |
| B32B 27/08 | (2006.01) |
| B32B 27/30 | (2006.01) |
| B32B 27/36 | (2006.01) |
| B32B 27/34 | (2006.01) |
| B65D 65/40 | (2006.01) |
| B65D 85/72 | (2006.01) |

(52) U.S. Cl.
CPC .............. *B32B 7/02* (2013.01); *B32B 7/12* (2013.01); *B32B 27/08* (2013.01); *B32B 27/306* (2013.01); *B32B 27/308* (2013.01); *B32B 27/32* (2013.01); *B32B 27/34* (2013.01); *B32B 27/36* (2013.01); *B65D 65/40* (2013.01); *B65D 85/72* (2013.01); *B32B 2250/24* (2013.01); *B32B 2307/31* (2013.01); *B32B 2307/406* (2013.01); *B32B 2307/412* (2013.01); *B32B 2307/514* (2013.01); *B32B 2307/518* (2013.01); *B32B 2307/546* (2013.01); *B32B 2307/558* (2013.01); *B32B 2307/704* (2013.01); *B32B 2307/72* (2013.01); *B32B 2439/70* (2013.01)

(58) Field of Classification Search
CPC . B32B 2250/24; B32B 2439/70; B32B 27/32; B32B 7/12; B32B 2307/704
See application file for complete search history.

(56) References Cited

U.S. PATENT DOCUMENTS

| | | | |
|---|---|---|---|
| 5,279,872 A | 1/1994 | Ralph | |
| 5,718,982 A | 2/1998 | Kawachi et al. | |
| 6,682,825 B1 | 1/2004 | Kennedy et al. | |
| 7,498,282 B2 | 3/2009 | Patel et al. | |
| 8,273,447 B2 | 9/2012 | Forloni | |
| 2006/0216471 A1 | 9/2006 | Gran et al. | |
| 2010/0116707 A1* | 5/2010 | Sasai | B29C 49/0005 206/524.2 |
| 2011/0083796 A1* | 4/2011 | Sheppard | B32B 27/32 156/213 |
| 2011/0185683 A1* | 8/2011 | Domenech | A01F 25/14 53/461 |
| 2014/0329103 A1 | 11/2014 | Zaikov et al. | |

FOREIGN PATENT DOCUMENTS

| | | |
|---|---|---|
| CN | 102190824 | 9/2011 |
| CN | 104385748 | 3/2015 |
| JP | H10278196 | 10/1998 |
| JP | 2006181831 | 7/2006 |
| JP | 2008080543 | 4/2008 |
| JP | 2009154317 | 7/2009 |

OTHER PUBLICATIONS

International Search Report and Written Opinion for related PCT Application PCT/CN2014/093708, dated Aug. 26, 2015 (10 pgs).

* cited by examiner

*Primary Examiner* — Alicia J Sawdon
(74) *Attorney, Agent, or Firm* — Brooks, Cameron & Huebsch, PLLC

(57) ABSTRACT

A multilayer structure comprising at least one skin sealant layer, wherein the skin layer comprises a polyethylene having a crystallinity, $C_S$; a tie layer which comprises a first polyethylene having a crystallinity, $C_T$, wherein the tie layer is adhered to the skin layer; and a bulk layer which comprises a second polyethylene having a crystallinity, $C_B$, wherein the tie layer is disposed between the bulk layer and the skin sealant layer; wherein $C_B > C_T > C_S$; and wherein the layers are coextruded and the multilayer structure oriented by a semi-molten orientation process is provided. Also provided is a laminate comprising the multilayer structure and articles comprising the laminate.

12 Claims, No Drawings

MULTILAYER STRUCTURE, A LAMINATE COMPRISING THE SAME AND ARTICLES COMPRISING THE LAMINATE

This application is a National Stage Application under 35 U.S.C. § 371 of International Application Number PCT/CN2014/093708, filed Dec. 12, 2014 and published as WO 2016/090633 on Jun. 16, 2016, the entire contents of which are incorporated herein by reference in its entirety.

FIELD OF INVENTION

The disclosure relates to a multilayer structure, a laminate comprising the same and articles comprising the laminate.

BACKGROUND OF THE INVENTION

Orientation is a common method to improve the physical strength of polymers. Certain biaxially oriented polyethylene films have been used to provide toughness and clarity, which are favorable for downgauging in flexible packaging applications. However, such biaxially oriented polyethylene films negatively impacted heat seal performance, especially on heat seal initial temperature. Therefore, additional structures for use in packaging applications which provide toughness and clarity and good heat seal performance would be beneficial.

SUMMARY OF THE INVENTION

The disclosure is for a multilayer structure, a laminate comprising e same and articles comprising the laminate.

In one embodiment, the disclosure provides a multilayer structure comprising at least one skin sealant layer, wherein the skin layer comprises a polyethylene having a crystallinity, $C_S$; a tie layer which comprises a first polyethylene having a crystallinity, $C_T$, wherein the tie layer is adhered to the skin layer; and a bulk layer which comprises a second polyethylene having a crystallinity, $C_B$, wherein the tie layer is disposed between the bulk layer and the skin sealant layer; wherein $C_B > C_T > C_S$; and wherein the layers are coextruded and the multilayer structure oriented by a semi-molten orientation process.

DETAILED DESCRIPTION OF THE INVENTION

The disclosure provides a multilayer structure, a laminate comprising the same and articles comprising the laminate.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or polymer mixture.

"Polyolefin" means a polymer which comprises greater than 50 wt % units derived from one or more olefinic monomers, for example ethylene or propylene (based on weight of the polymer) and, optionally, may contain at least one comonomer.

"Polyethylene" means a polymer having greater than 50 wt % units derived from ethylene monomer.

"Polypropylene" means a polymer having greater than 50 wt % units derived from propylene monomer.

"Multilayer structure" means any structure having more than one layer. For example, the multilayer structure may have two, three, four, five or more layers. A multilayer structure may be described as having the layers designated with letters. For example, a three layer structure having a core layer B, and two external layers A and C may be designated as A/B/C. Likewise, a structure having two core layers B and C and two external layers A and D would be designated A/B/C/D.

In a first embodiment, the disclosure provides a multilayer structure comprising at least one skin sealant layer, wherein the skin layer comprises a polyethylene having a crystallinity, $C_S$; a tie layer which comprises a first polyethylene having a crystallinity, $C_T$, wherein the tie layer is adhered to the skin layer; and a bulk layer which comprises a second polyethylene having a crystallinity, $C_B$, wherein the tie layer is disposed between the bulk layer and the skin sealant layer; wherein $C_B > C_T > C_S$; and wherein the layers are coextruded and the multilayer structure oriented by a semi-molten orientation process.

Polyethylenes useful in the skin and tie layers include, but are not limited to, ethylene homopolymer, ethylene/α-olefin copolymers, ethylene/α-olefin/diene interpolymers, ethylene vinyl acetate copolymers and ethylene methacrylate copolymers.

In a second embodiment, the disclosure provides a laminate comprising the multilayer structure according to any embodiment disclosed herein laminated onto a substrate selected from the group consisting of biaxially oriented polyethylene terephthalate, biaxially oriented polypropylene, and biaxially oriented polyamide, and biaxially oriented polyethylene.

In a third embodiment, the disclosure provides a packaging comprising the laminate according to any embodiment disclosed herein.

The disclosure provides the multilayer structure, laminate and packaging according to any embodiment disclosed herein, except that $C_B$ is from 42 to 63%. All individual values and subranges from 42 to 63% are included and disclosed herein. For example, $C_B$ can range from a lower limit of 42, 47, 52, 59, or 61% to an upper limit of 44, 49, 54, 61 or 63%. For example, $C_B$ can be from 42 to 63%, or in the alternative, from 42 to 52%, or in the alternative, from 52 to 63%, or in the alternative, from 45 to 60%.

The disclosure provides the multi layer structure, laminate and packaging according to any embodiment disclosed herein, except that $C_B - C_S$ is greater than 3%. All individual values from greater than 3% are included and disclosed herein. For example, $C_B - C_S$ is greater than 3%, or in the alternative, greater than 4%, or in the alternative, greater than 5%, or in the alternative, greater than 6%.

The disclosure provides the multilayer structure, laminate and packaging according to any embodiment disclosed herein, except that the second polyethylene has a density from 0.910 to 0.940 g/cc. All individual values and subranges from 0.910 to 0.940 g/cc are included and disclosed herein; for example the density can range from a lower limit of 0.910, 0.920, 0.930 or 0.938 g/cc to an upper limit of 0.915, 0.926, 0.937, or 0.940 g/cc. For example, the density of the second polyethylene can have a density from 0.910 to 0.940 g/cc, or in the alternative, from 0.925 to 0.940 g/cc, or in the alternative, from 0.910 to 0.926 g/cc, or in the alternative, from 0.915 to 0.935 g/cc.

The disclosure provides the multilayer structure, laminate and packaging according to any embodiment disclosed herein, except that the density of the second polyethylene is at least 0.005 g/cc greater than the density of the oriented polyethylene. All individual values and subranges from at least 0.005 g/cc greater than the density of the oriented polyethylene are included and disclosed herein. For example, the density of the second polyethylene may be at least 0.005 g/cc greater than the density of the oriented polyethylene, or in the alternative, at least 0.005 g/cc greater than the density of the oriented polyethylene, or in the alternative, at least 0.007 g/cc greater than the density of the oriented polyethylene, or in the alternative, at least 0.01 g/cc greater than the density of the oriented polyethylene.

The disclosure provides the multi layer structure, laminate and packaging according to any embodiment disclosed herein, except that the multilayer structure has a thickness from 20 to 80 microns. All individual values and subranges from 20 to 80 microns are included and disclosed herein; for example the thickness of the multilayer structure can range from a lower limit of 20, 30, 40, 50, 60 or 70 microns to an upper limit of 25, 34, 45, 56, 65, 74 or 80 microns. For example, the thickness of the multilayer structure can range from 20 to 80 microns, or in the alternative, from 40 to 60 microns, or in the alternative from 20 to 50 microns, or in the alternative, from 40 to 80 microns.

The disclosure provides the multi layer structure, laminate and packaging according to any embodiment disclosed herein, except that the multilayer structure is a sealant layer.

The disclosure provides the multi layer structure, laminate and packaging according to any embodiment disclosed herein, except that the first polyethylene of the tie layer has a cumulative weight fraction greater than 0.18 for the fractions with a temperature from 95 to 115° C. All individual values and subranges from greater than 0.18 cumulative weight fraction are included and disclosed herein. For example, the first polyethylene of the tie layer has a cumulative weight fraction for the fractions with a temperature from 95 to 115° C. of greater than 0.18, or in the alternative, greater than 0.22, or in the alternative, greater than 0.25, or in the alternative, greater than 0.3.

The disclosure provides the laminate and packaging according to any embodiment disclosed herein, except that the multilayer structure is laminated onto the substrate by extrusion lamination.

The disclosure provides the laminate and packaging according to any embodiment disclosed herein, except that the multilayer structure is laminated onto the substrate by adhesive lamination.

The disclosure provides the laminate and packaging according to any embodiment disclosed herein, except that the adhesive is solvent based.

The disclosure provides the laminate and packaging according to any embodiment disclosed herein, except that the adhesive is solvent free.

The disclosure provides the laminate and packaging according to any embodiment disclosed herein, except that the adhesive is water based.

The packaging according to any embodiment described herein may be used for any purpose and to contain any type of product. in a particular embodiment, the packaging is used to contain liquid, powder, or dry food products.

EXAMPLES

The following examples illustrate the present invention but are not intended to limit the scope of the invention.

Three mono- or multi-layer structures were prepared, Comparative Structures 1 and 2 and Inventive Structure 1. The compositions of each layer are shown in Table 1. Total thickness of each multilayer structure is approximately 1000 microns. Because all three layers of Comparative Structure 1 are made from the same material, this structure is a monolayer structure with no specified sealant layer. ELITE 5220G is coextruded as the sealant layer in Comparative Structure 2. However, the bulk and tie layers of Comparative Structure 2 have the same composition. In the Inventive Structure 1, the compositions of the bulk, tie and sealant layers are different. A blend of 63 wt % 13C09R02, 7 wt % LDPE 621i and 30 wt % ELITE 5220G with a density of 0.923 g/cc and 47% crystallinity was employed as the tie layer.

TABLE 1

|  | Layer Ratio | Comparative Structure 1 | Comparative Structure 2 | Comparative Structure 3 | Inventive Structure 1 |
|---|---|---|---|---|---|
| Bulk layer | 70% | 90% LLDPE-1 + 10% LDPE 621i | 90% LLDPE-1 + 10% LDPE 621i | 90% LLDPE-1 + 10% LDPE 621i | 90% LLDPE-1 + 10% LDPE 621i |
| Tie layer | 15% | 90% 1 LLDPE-1 + 10% LDPE 621i | 90% LLDPE-1 + 10% LDPE 621i | 100% DOWLEX 2047G | 63% LLDPE-1 + 7% LDPE 621i + 30% ELITE 5220G |
| Sealant layer | 15% | 90% LLDPE-1 + 10% LDPE 621i | 100% ELITE 5220G | 100% ELITE 5220G | 100% ELITE 5220G |

LDPE 620i is a low density polyethylene (commercially available from The Dow Chemical Company (Midland, 11411, USA) having a melt index, I2, of 2.3 g/10 min and a density of 0.920 g/cm$^3$. ELITE 5220G is an octene-based LLDPE having a melt index, $I_2$, of 3.5 g/10 min and a density of 0.915 g/cc (commercially available from The Dow Chemical Company). DOWLEX 20476 is a linear low density polyethylene having a melt index, $I_2$, of 2.3 g/10 min and a density of 0.917 g/cc which is commercially available from The Dow Chemical Company.

LLDPE-1 an ethylene/1-octene based linear low density polyethylene LDPE) with an $I_2$ of 1.6 g/10 min and a density of 0.926 g/cc.

LLDPE's include Ziegler Natta catalyzed linear low density polyethylene, single site catalyzed (including metallocene) linear low density polyethylene (m-LLDPE), and medium density polyethylene (MDPE) so long as the MDPE has a density no greater than 0.940 g/cm$^3$; as well as combinations of two or more of the foregoing. These polyethylene resins are generally known in the art. The LLDPE resins best suited for use in the present application can be characterized by the following three parameters.

The LLDPE for use in the present invention has an $MW_{HDF}$>95 greater than 135 kg/mol and $I_{HDF}$>95 greater than 42 kg/mol.

The LLDPE preferably has a melt index (190° C., 2.16 kg) in the range of from 0.5 to 10 g/10 minutes.

The LLDPE preferably has a density in the range of from 0.91 to 0.94 g/cm$^3$.

Molecular Weight of High Density Fraction (MW$_{HDF>95}$) and High Density Fraction Index (I$_{HDF>95}$)

The polymer molecular weight can be determined directly from LS (light scattering at 90 degree angle, Precision Detectors) and the concentration detector (IR-4, Polymer Char) according to the Rayleigh-Gans-Debys approximation (A. M. Striegel and W. W. Yau, Modern Size-Exclusion Liquid Chromatography, 2$^{nd}$ Edition, Page 242 and Page 263, 2009) by assuming a form factor of 1 and all the virial coefficients equal to zero. Baselines are subtracted from the LS (90 degree) and IR-4 (measurement channel) chromatograms. For the whole resin, integration windows are set to integrate all the chromatograms in the elution temperature (temperature calibration is specified above) ranging from 25.5 to 118° C. The high density fraction is defined as the fraction that has an elution temperature higher than 95.0° C. in CEF. Measuring the MW$_{HDF>95}$ and I$_{HDF>95}$ includes the following steps:

(1) Measuring the interdetector offset. The offset is defined as the geometric volume offset between LS detector with respect to the IR-4 detector. It is calculated as the difference in elution volume (mL) of the polymer peak between the IR-4 and LS chromatograms. It is converted to the temperature offset by using the elution thermal rate and elution flow rate. A high density polyethylene (with no comonomer, melting index I$_2$ of 1.0, polydispersity or molecular weight distribution M$_w$/M$_n$ approximately 2.6 by conventional gel permeation chromatography) is used. The same experimental conditions as the CEF method above are used except for the following parameters: crystallization at 10° C./min from 140° C. to 137° C., thermal equilibrium at 137° C. for 1 minute as the Soluble Fraction Elution Time, and elution at 1° C./min from 137° C. to 142° C. The flow rate during crystallization is 0.10 ml/min. The flow rate during elution is 0.80 ml/min. The sample concentration is 1.0 mg/ml.

(2) Each data point in the LS chromatogram is shifted to correct for the interdetector offset before integration.

(3) Molecular weight at each retention temperature is calculated as the baseline subtracted LS signal/the baseline subtracted IR4 signal/MW constant (K)

(4) The baseline subtracted LS and IR-4 chromatograms are integrated in the elution temperature range of 95.0 to 118.0° C.

(5) The Molecular weight of the high density fraction (MW$_{HDF>95}$) is calculated according to $$MW_{HDF>95} = \int_{95}^{118} Mw \cdot C \cdot dT / \int_{95}^{118} C \cdot dT$$

where Mw is the molecular weight of the polymer fraction at the elution temperature T and C is the weight fraction of the polymer fraction at the elution temperature T in the CEF, and $$\int_{25}^{118} C \cdot dT = 100\%$$

(6) High density fraction index (I$_{HDF>95}$) is calculated as $$I_{HDF>95} = \int_{95}^{118} Mw \cdot C \cdot dT$$

where in is the molecular weight of the polymer fraction at the elution temperature T in the CEF.

The MW constant (K) of CEF is calculated by using NIST polyethylene 1484a analyzed with the same conditions as for measuring interdetector offset. The MW constant (K) is calculated as "(the total integrated area of LS) of NIST PE1484a/(the total integrated area) of IR-4 measurement channel of NIST PE 1484a/122,000".

The white noise level of the LS detector (90 degree) is calculated from the LS chromatogram prior to the polymer eluting. The LS chromatogram is first corrected for the baseline correction to obtain the baseline subtracted signal. The white noise of the LS is calculated as the standard deviation of the baseline subtracted LS signal by using at least 100 data points prior to the polymer eluting. Typical white noise for LS is 0.20 to 0.35 mV while the whole polymer has a baseline subtracted peak height typically around 170 mV for the high density polyethylene with no comonomer, I$_2$ of 1.0, polydispersity M$_w$/M$_n$ approximately 2.6 used in the interdetector offset measurements. Care should be maintained to provide a signal to noise ratio (the peak height of the whole polymer to the white noise) of at least 500 for the high density polyethylene.

Overall densities and calculated crystallinity of the polymer formulation in each layer of Comparative Structures 1 and 2 and Inventive Structure 1 are listed Table 2.

TABLE 2

| | Comparative Structure 1 | Comparative Structure 2 | Comparative Structure 3 | Inventive Structure 1 |
|---|---|---|---|---|
| Bulk layer density | 0.926 g/cm$^3$ | 0.926 g/cm$^3$ | 0.926 g/cm$^3$ | 0.926 g/cm$^3$ |
| Bulk layer crystallinity | 52.9% | 52.9% | 52.9% | 52.9% |
| Tie layer density | 0.926 g/cm$^3$ | 0.926 g/cm$^3$ | 0.917 g/cc | 0.923 g/cm$^3$ |
| Tie layer crystallinity | 52.9% | 52.9% | 46.6% | 50.8% |
| Sealant layer density | 0.926 g/cm$^3$ | 0.915 g/cm$^3$ | 0.915 g/cc | 0.955 g/cm$^3$ |
| Sealant layer crystallinity | 52.9% | 45.1% | 45.5% | 45.1% |

The Comparative and Inventive Structures were subjected to a 6×6 simultaneous stretch on Accupull lab stretcher with a 118° C. stretching temperature and 200% per second stretching speed. The stretched film was laminated onto a 12 micron biaxially oriented polyethylene terephthalate (BO-PET) film, by MOR-FREE MF698A+C79 (100:50) (which is an organic solventless, two-component polyurethane adhesive system processed at 40-45° C. commercially available from The Dow Chemical Company) at 1.7 gsm coating weight. Seal strength of the laminated films were tested and the heat seal strength (N/25 mm) results shown in Table 3.

TABLE 3

| | Seal Temperature (° C.) | | | | | | | |
|---|---|---|---|---|---|---|---|---|
| | 90 | 100 | 110 | 120 | 130 | 140 | 150 | 160 |
| Comparative Structure 1/BOPET Laminate | 0.16 | −0.09 | 0.06 | 0.2 | 1.53 | 40.6 | 31.85 | 10.67 |
| Comparative Structure 2/BOPET laminate | −0.04 | 4.64 | 6.85 | 7.26 | 12.75 | 28.90 | 31.18 | 26.65 |
| Comparative Structure 3/BOPET laminate | 0.89 | 1.09 | 6.16 | 6.29 | 10.97 | 22.92 | 17.7 | 18.50 |
| Inventive Structure 1/BOPET laminate | −0.09 | −0.13 | 9.79 | 13.77 | 19.52 | 33.92 | 41.63 | 39.79 |

Comonomer distribution analysis is performed with Crystallization Elution Fractionation (CEF) was conducted on Comparative Structure 3 and Inventive Structure 1. The results of the CEF analysis are given in Table 4.

TABLE 4

| °C. | Wt % in Each Temperature Zone | | |
|---|---|---|---|
|  | 25-35 | 35-95 | 95-115 |
| Comparative Structure 3 | 6.1% | 79.0% | 14.9% |
| Inventive Structure 1 | 2.9% | 64.1% | 33.0% |

Test Methods

Test methods include the following:
Polymer crystallinity can be measured by differential scanning calorimetry, and other analytical methods. For ethylene homopolymer or ethylene alpha-olefin copolymers, and the examples herein, crystallinity can be calculated from its density by the following equation:

$$\text{Cryst.} = \frac{1}{\text{Den.}}\left(\frac{\text{Den.}-0.855}{0.145}\right)$$

Polymer density is measured according to ASTM D792.
Seal Strength: The hot tack tester (Model 4000, J&B Corp.) is used in "seal only" mode without pulling, to conduct heat seal. Seal parameters are as follows: sample width=25 mm; seal time=0.5 s; seal pressure=0.275 MPa. Then, sealed specimens were aged about 24 hours, under controlled environment (23±2° C., 55±5 relative humidity). Thereafter, seal strength is tested on a tensile machine (Type 5943, INSTRON Corp.) with pulling speed of 500 mm/min. Max load was recorded as seal strength.
CEF Method: Comonomer distribution analysis is performed with Crystallization Elution Fractionation (CEF) (PolymerChar, Spain) (Monrabal et al, Macromol. Symp. 257, 71-79 (2007)) equipped with IR-4 detector (PolymerChar, Spain) and two angle light scattering detector Model 2040 (Precision Detectors, currently Agilent Technologies). IR-4 or IR-5 detector is used. A 10 micron guard column of 50×4.6 mm (PolymerLab, currently Agilent Technologies) was installed just before IR-4 detector in the detector oven. Ortho-dichlorobenzene (ODCB, 99% anhydrous grade) and 2,5-di-tert-butyl-4-methylphenol (BHT, catalogue number B1378-500G, batch number 098K0686) were purchased from Sigma-Aldrich. Silica gel 40 (particle size 0.2~0.5 mm, catalogue number 10181-3) was purchased from EMD Chemicals. The silica gel was dried in a vacuum oven at 160° C. for about two hours before use. Eight hundred milligrams of BHT and five grams of silica gel were added to two liters of ODCB. ODCB containing BHT and silica gel" is now referred to as "ODCB." This ODBC was sparged with dried nitrogen (N2) for one hour before use. Dried nitrogen is such that is obtained by passing nitrogen at <90 psig over CaCO3 and 5 Å molecular sieves. The resulting nitrogen should have a dew point of approximately −73° C. Sample preparation is done with autosampler at 4 mg/ml (unless otherwise specified) under shaking at 160° C. for 2 hours. The injection volume is 300 µl. The temperature profile of CEF is: crystallization at 3° C./min from 110° C. to 30° C., the thermal equilibrium at 30° C. for 5 minutes (including Soluble Fraction Elution Time being set as 2 minutes), elution at 3° C./min from 30° C. to 140° C. The flow rate during crystallization is 0.052 ml/min. The flow rate during elution is 0.50 ml/min. The data is collected at one data point/second.
CEF column is packed by the Dow Chemical Company with glass beads at 125 µm±6% (MO-SCI Specialty Products) with ⅛ inch stainless tubing according to US 2011/0015346 A1. The column outside diameter (OD) is ⅛ inch. The critical parameters needed to duplicate the method include the column internal diameter (ID), and column length (L). The choice of ID and L must be such that when packed with the 1.25 µm diameter glass beads, that the liquid internal volume is 2.1 to 2.3 mL. If L is 152 cm, then ID must be 0.206 cm and the wall thickness must be 0.056 cm. Different values for L and ID can be used, as long as the glass bead diameter is 125 m and the internal liquid volume is between 2.1 and 2.3 mL. Column temperature calibration is performed by using a mixture of NIST Standard Reference Material Linear polyethylene 1475a (1.0 mg/ml) and Eicosane (2 mg/ml) in ODCB. CEF temperature calibration consists of four steps: (1) Calculating the delay volume defined as the temperature offset between the measured peak elution temperature of Eicosane minus 30.00° C.; (2) Subtracting the temperature offset of the elution temperature from CEF raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that NIST linear polyethylene 1475a has a peak temperature at 101.0° C., and Eicosane has a peak temperature of 30.0° C., (4) For the soluble fraction measured isothermally at 30° C., the elution temperature is extrapolated linearly by using the elution heating rate of 30° C./min. The reported elution peak temperatures are obtained such that the observed comonomer content calibration curve agrees with those previously reported in US 2011/0015346 A1.

The present invention may be embodied in other forms without departing from the spirit and the essential attributes thereof, and, accordingly, reference should be made to the appended claims, rather than to the foregoing specification, as indicating the scope of the invention.

The invention claimed is:
1. A multilayer structure comprising:
at least one skin sealant layer, wherein the skin layer comprises an oriented polyethylene having a crystallinity, Cs, from 38% to 59%;
a tie layer which comprises a first polyethylene having a crystallinity, $C_T$, wherein the tie layer is adhered to the skin layer, wherein the first polyethylene of the tie layer has a cumulative weight fraction greater than 0.18 for the fractions with an elution temperature from 95 to 115° C.; and
a bulk layer which comprises a second polyethylene having a density of 0.910 to 0.935 g/cc and a crystallinity, $C_B$, from 42% to 63%, wherein the tie layer is disposed between the bulk layer and the skin sealant layer, wherein the density of the second polyethylene is at least 0.005 g/cc greater than a density of the oriented polyethylene;
wherein $C_B > C_T > C_S$; and
wherein the layers are coextruded and the multilayer structure oriented by a semi-molten orientation process.
2. The multilayer structure according to claim 1, wherein $C_B - C_S$ is greater than 3%.

3. The multilayer structure according to claim 1, wherein the multilayer structure has a thickness from 20 to 80 microns.

4. A laminate comprising the multilayer structure according to claim 1 laminated onto a substrate selected from the group consisting of biaxially oriented polyethylene terephthalate, biaxially oriented polypropylene, and biaxially oriented polyamide.

5. The laminate according to claim 4 wherein the multilayer structure is a sealant layer.

6. The laminate according to claim 4, wherein the multilayer structure is laminated onto the substrate by extrusion lamination.

7. The laminate according to claim 4, wherein the multilayer structure is laminated onto the substrate by adhesive lamination.

8. The laminate according to claim 7, wherein the adhesive is organic solvent based.

9. The laminate according to claim 7, wherein the adhesive is water based.

10. The laminate according to claim 7, wherein the adhesive is free of organic based solvent.

11. A packaging comprising the laminate according to claim 7.

12. The packaging according to claim 11, wherein the packaging is used for packaging liquid, powder, or dry food product.

\* \* \* \* \*